(12) United States Patent
Levin et al.

(10) Patent No.: US 11,809,059 B2
(45) Date of Patent: Nov. 7, 2023

(54) TECHNIQUES FOR ADJUSTING AN OPTICAL BEAM TRAJECTORY

(71) Applicant: AEVA, INC., Mountain View, CA (US)

(72) Inventors: Bradley Scot Levin, San Jose, CA (US); Keith Gagne, Santa Clara, CA (US); Neal N. Oza, Washington, DC (US); Cameron Howard, Bend, OR (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/745,657

(22) Filed: May 16, 2022

(65) Prior Publication Data
US 2023/0125665 A1 Apr. 27, 2023

Related U.S. Application Data

(63) Continuation of application No. 17/510,880, filed on Oct. 26, 2021, now Pat. No. 11,333,949.

(51) Int. Cl.
*G02F 1/29* (2006.01)
*G01S 7/481* (2006.01)
*G02B 27/09* (2006.01)

(52) U.S. Cl.
CPC .............. *G02F 1/291* (2021.01); *G01S 7/481* (2013.01); *G02B 27/0905* (2013.01); *G02B 27/0972* (2013.01)

(58) Field of Classification Search
CPC ..... G02F 1/291; G01S 7/481; G02B 27/0905; G02B 27/0972
USPC .......................................................... 359/10
See application file for complete search history.

(56) References Cited

U.S. PATENT DOCUMENTS

| 5,917,596 | A | 6/1999 | Jenkins et al. |
|---|---|---|---|
| 6,313,908 | B1 | 11/2001 | McGill et al. |
| 6,420,698 | B1 | 7/2002 | Dimsdale |
| 2012/0188467 | A1 | 7/2012 | Escuti et al. |
| 2016/0041266 | A1 | 2/2016 | Smits |
| 2017/0307876 | A1 | 10/2017 | Dussan et al. |

(Continued)

FOREIGN PATENT DOCUMENTS

| WO | WO-9602013 A1 * | 1/1996 | ............. G02B 27/09 |
|---|---|---|---|
| WO | WO-2016203998 A1 * | 12/2016 | ......... G02B 27/0905 |
| WO | WO-2022061040 A1 * | 3/2022 | |

*Primary Examiner* — Collin X Beatty
*Assistant Examiner* — Grant A Gagnon
(74) *Attorney, Agent, or Firm* — Womble Bond Dickinson (US) LLP

(57) ABSTRACT

A system and method including, receiving a plurality of optical beams in a first direction along a first plane in a first beam pattern towards an optical element based on a trajectory that causes at least a portion of the plurality of optical beams to not contact a surface of the optical lens. The system and method includes transmitting a first set of the plurality of optical beams in the first direction along a second plane. The system and method includes transmitting a second set of the plurality of optical beams in the first direction along the first plane. The system and method includes generating a second beam pattern by transmitting the first set and the second set of the plurality of optical beams through an optical element, wherein the second beam pattern adjusts the trajectory to cause the portion to contact the surface of the optical lens.

20 Claims, 5 Drawing Sheets

(56) References Cited

U.S. PATENT DOCUMENTS

2019/0072649 A1    3/2019   Droz et al.
2020/0249354 A1    8/2020   Yeruhami et al.
2021/0011132 A1    1/2021   Ellis et al.

* cited by examiner

500

```
┌─────────────────────────────────────────────┐
│ receiving, by an optical assembly, a plurality of optical │
│ beams propagating in a first direction along a first plane │
│ in a coplanar beam pattern │
│ 502 │
└─────────────────────────────────────────────┘
                        ↓
┌─────────────────────────────────────────────┐
│ redirecting, by the optical assembly, a first set of the │
│ plurality of optical beams to propagate in the first │
│ direction along a second plane │
│ 504 │
└─────────────────────────────────────────────┘
                        ↓
┌─────────────────────────────────────────────┐
│ redirecting, by the optical assembly, a second set of the │
│ plurality of optical beams to propagate in a second │
│ direction along the first plane │
│ 506 │
└─────────────────────────────────────────────┘
                        ↓
┌─────────────────────────────────────────────┐
│ redirecting, by the optical assembly, the second set of │
│ the plurality of optical beams propagating in the second │
│ direction along the first plane to propagate in the first │
│ direction along the first plane │
│ 508 │
└─────────────────────────────────────────────┘
                        ↓
┌─────────────────────────────────────────────┐
│ generating, by the optical assembly, a multi-planar beam │
│ pattern by forwarding the first set of the plurality of optical │
│ beams and the second set of the plurality of optical │
│ beams through an optical element │
│ 510 │
└─────────────────────────────────────────────┘
```

FIG. 5

TECHNIQUES FOR ADJUSTING AN OPTICAL BEAM TRAJECTORY

RELATED APPLICATION

This application is a continuation of U.S. patent application Ser. No. 17/510,880, filed on Oct. 26, 2021, the entire contents of which is incorporated herein by reference in its entirety.

TECHNICAL FIELD

The present disclosure relates generally to optical beam patterns, and more particularly to systems and methods for transforming a linear co-planar optical beam pattern into a multi-planar optical beam pattern.

BACKGROUND

Conventional light detection and ranging (LIDAR) systems operate by sending pulses toward a target and measuring the time the pulses take to reach the target and return to a sensor. In such systems, the user learns information about the distance to the object, which when coupled with a scanner can provide a 3-D point cloud of the sensor's field-of-view. These conventional techniques require more space in an optical assembly due to physical specifications which in turn can cause less desirable beam patterns.

SUMMARY

One aspect disclosed herein is directed to a method for transforming a linear co-planar optical beam pattern into a multi-planar optical beam pattern. In some embodiments, the method includes receiving (e.g., obtaining, acquiring), by an optical assembly, a plurality of optical beams propagating in a first direction along a first plane in a co-planar beam pattern. In some embodiments, the method includes redirecting (e.g., sending, scattering, forwarding, relaying), by the optical assembly, a first set of the plurality of optical beams to propagate in the first direction along a second plane. In some embodiments, the method includes redirecting, by the optical assembly, a second set of the plurality of optical beams to propagate in a second direction along the first plane. In some embodiments, the method includes redirecting, by the optical assembly, the second set of the plurality of optical beams propagating in the second direction along the first plane to propagate in the first direction along the first plane. In some embodiments, the method includes generating (e.g., producing, constructing), by the optical assembly, a multi-planar beam pattern by forwarding the first set of the plurality of optical beams and the second set of the plurality of optical beams through an optical element In another aspect, the present disclosure is directed to a system for transforming a linear co-planar optical beam pattern into a multi-planar optical beam pattern. In some embodiments, the system includes an optical source to generate a plurality of optical beams that propagate in a first direction along a first plane in a coplanar beam pattern. In some embodiments, the system includes an optical assembly coupled to the optical source. In some embodiments, the optical assembly includes one or more optical elements to receive the plurality of optical beams. In some embodiments, the optical assembly includes one or more optical elements to redirect a first set of the plurality of optical beams to propagate in the first direction along a second plane. In some embodiments, the optical assembly includes one or more optical elements to redirect a second set of the plurality of optical beams to propagate in a second direction along the first plane. In some embodiments, the optical assembly includes one or more optical elements to redirect the second set of the plurality of optical beams propagating in the second direction along the first plane to propagate in the first direction along the first plane. In some embodiments, the optical assembly includes one or more optical elements to generate a multi-planar beam pattern by forwarding the first set of the plurality of optical beams and the second set of the plurality of optical beams through an optical element.

In another aspect, the present disclosure is directed to an optical assembly for transforming a linear co-planar optical beam pattern into a multi-planar optical beam pattern. In some embodiments, the optical assembly includes a first optical element to receive a first set of a plurality of optical beams. In some embodiments, the plurality of optical beams propagate in a first direction along a first plane in a coplanar beam pattern. In some embodiments, the optical assembly includes a first optical element that is configured to redirect the first set of the plurality of optical beams to propagate in the first direction along a second plane. In some embodiments, the first optical element is configured to forward the first set of the plurality of optical beams through an optical element. In some embodiments, the optical assembly includes a second optical element that is configured to receive a second set of the plurality of optical beams. In some embodiments, the second optical element is configured to redirect the second set of the plurality of optical beams to propagate in the second direction along the first plane. In some embodiments, the second optical element is configured to redirect the second set of the plurality of optical beams propagating in the second direction along the first plane to propagate in the first direction along the first plane. In some embodiments, the second optical element is configured to forward the second set of the plurality of optical beams through the optical element. In some embodiments, a multi-planar beam pattern is generated responsive to the forwarding of the first set of the plurality of optical beams through the optical element by the first optical element and the forwarding of the second set of the plurality of optical beams through the optical element.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

FIG. 5 is a flow diagram illustrating an example method for transforming a linear co-planar optical beam pattern into a multi-planar optical beam pattern, according to some embodiments.

DETAILED DESCRIPTION

Figure 1:
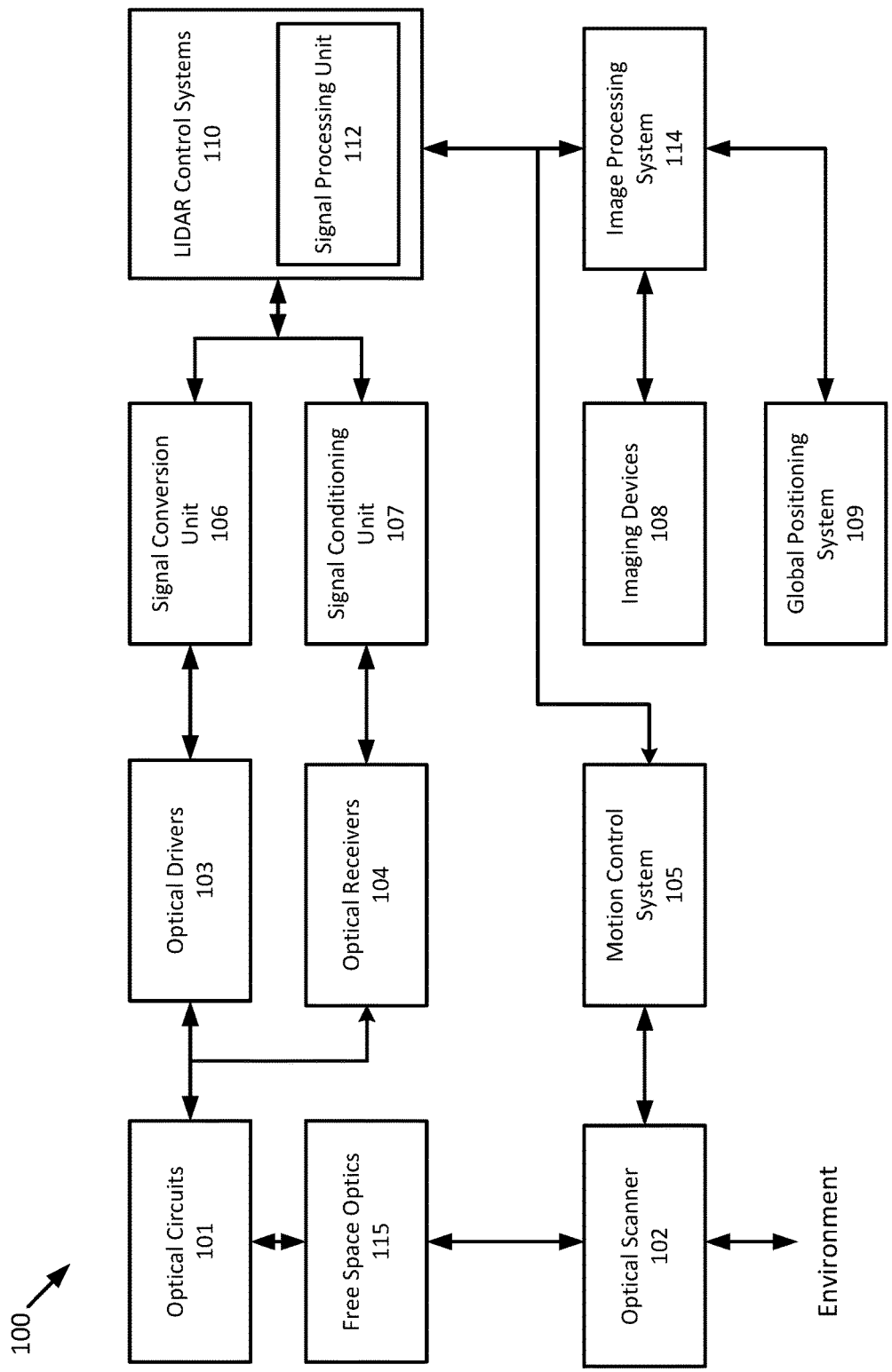
FIG. 1 is a block diagram illustrating an example of a LIDAR system, according to some embodiments.

According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

LIDAR systems use tunable lasers for frequency-chirped illumination of targets, and coherent receivers for detection of backscattered or reflected light from the targets that are combined with a local copy of the transmitted signal (LO signal). Conventional LIDAR systems require high frame rates and an increased number of scanning points typically achieved by using a photonic integrated circuit (PIC) that generates and transmits a plurality of optical beams in a linear co-planar pattern (e.g., array), where the optical beams are separated from another by some distance, referred to as pitch. The LIDAR system transmits the optical beams in the linear co-planar pattern through a single output lens that provides angular separation between collimated optical beams to create discrete lines after reaching the scanner of the LIDAR system. By using a single output lens for multiple optical beams, the LIDAR designer may reduce the cost of the form factor of the LIDAR system in comparison to adding additional output lenses.

However, as more optical beams are added to the LIDAR system using a single output lens, the dimensions (e.g., a height, a width, a length, and/or a diameter) of the linear co-planar pattern of the optical beams will eventually exceed the dimensions of the output lens; thereby preventing the optical beams from being able to simultaneously pass through the lens without obstruction.

Accordingly, the present disclosure addresses the above-noted and other deficiencies by disclosing systems and methods for transforming a linear co-planar optical beam pattern into a multi-planar optical beam pattern. As described in the below passages with respect to one or more embodiments, an optical assembly (e.g., an enclosure or an unenclosed environment) receives a plurality of optical beams from one or more optical beam sources that are included or associated (e.g., controlled by, triggered by) with the LIDAR system 100 in FIG. 1, such as a photonic integrated circuit (PIC) that generates and transmits a plurality of optical beams toward the optical assembly. Each beam of the plurality of optical beams is propagating (e.g., traversing) in a first direction (e.g., X-axis) along a first plane, such to form a linear coplanar beam pattern (e.g., [1, N] array, where N is the number of optical beams in the pattern). The optical assembly redirects a first set (e.g., one or more) of the plurality of optical beams to propagate in the first direction along a second plane. The optical assembly redirects a second set (e.g., one or more) of the plurality of optical beams to propagate in a second direction along the first plane. The optical assembly redirects the second set of the plurality of optical beams that are propagating in the second direction along the first plane to propagate in the first direction along the first plane. The optical assembly generates a multi-planar beam pattern (e.g., [2, ½×N] array, where N is the number of optical beams in the pattern) by forwarding the first set of the plurality of optical beams and the second set of the plurality of optical beams through an optical element (e.g., a lens).

When the plurality of optical beams is arranged in a linear co-planar beam pattern, they cannot fit within the dimensions of the lens because the dimensions (e.g., a height, a width, a length, and/or a diameter) of the linear co-planar pattern exceeds the dimensions of the lens. However, the optical assembly's transformation of the plurality of optical beams from a linear co-planar beam pattern to a multi-planar beam pattern allows the plurality of optical beams to fit within the dimensions of the lens; thereby allowing the plurality of optical beams to simultaneously pass through the lens without obstruction.

There are several advantages for using the one or more embodiments of the present disclosure for transforming a linear co-planar optical beam pattern into a multi-planar optical beam pattern. For one, the dimensions of a multi-planar optical beam pattern occupy less space within the optical assembly as compared to the dimensions of a linear co-planar beam pattern. By occupying less space, the optical assembly may use a smaller window for passing the plurality of optical beams to a lens. The dimensions of the lens may also be reduced without interfering with the passing of the plurality of optical beams through the lens. Using a multi-planar optical beam pattern, instead of a linear co-planar beam pattern also allows for creating asymmetric (e.g., irregular, uneven) vertical beam spacing because, for example, the square shape of a 2×2 multi-planar optical beam pattern can be rotated to tune beam spacing for the center 2 beams and the outside 2 beams.

FIG. 1 is a block diagram illustrating an example of a LIDAR system, according to some embodiments. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like. In some embodiments, one or more LIDAR systems 100 may be mounted onto any area (e.g., front, back, side, top, bottom, and/or underneath) of a vehicle to facilitate the detection of an object in any free-space relative to the vehicle. In some embodiments, the vehicle may include a steering system and a braking system, each of which may work in combination with one or more LIDAR systems 100 according to any information (e.g., distance/ranging information, Doppler information, etc.) acquired and/or available to the LIDAR system 100. In some embodiments, the vehicle may include a vehicle controller that includes the one or more components and/or processors of the LIDAR system 100.

Free space optics 115 may include one or more optical waveguides to carry optical signals, and route and manipulate optical signals to appropriate input/output ports of the active optical circuit. In embodiments, the one or more optical waveguides may include one or more graded index waveguides, as will be described in additional detail below at FIGS. 3-6. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control system 110 may include a processing device that may be implemented with a DSP, such as signal processing unit 112. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processing unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data (sometimes referred to as, "a LIDAR point cloud") that includes information about range and/or velocity points in the target environment as the optical scanner 102 scans additional points. In some embodiments, a LIDAR point cloud may correspond to any other type of ranging sensor that is capable of Doppler measurements, such as Radio Detection and Ranging (RADAR). The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
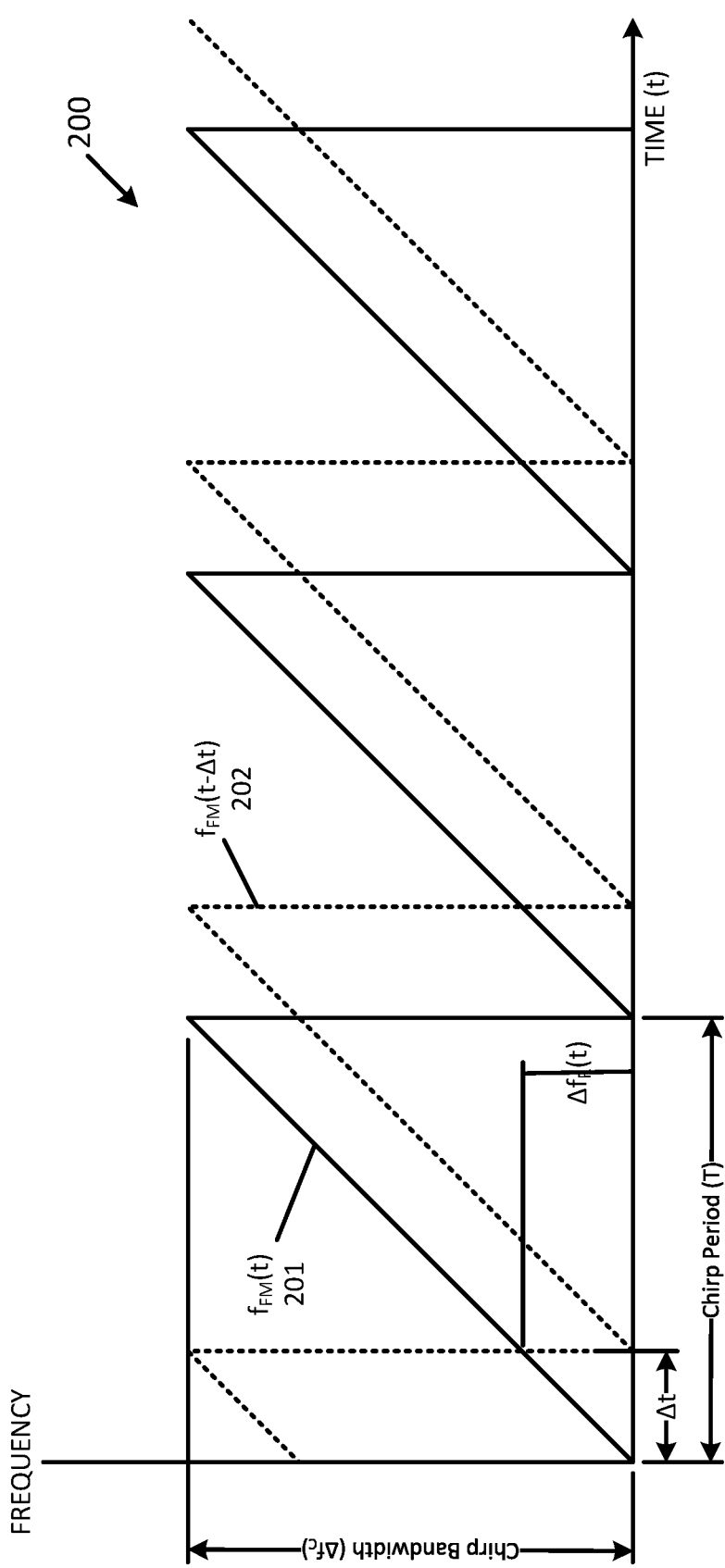
FIG. 2 is a time-frequency diagram illustrating an example of an FMCW scanning signal that can be used by a LIDAR system to scan a target environment, according to some embodiments.

FIG. 2 is a time-frequency diagram illustrating an example of an FMCW scanning signal that can be used by a LIDAR system to scan a target environment, according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning waveform 201, where $\Delta t$ is the round trip time to and from a target illuminated by scanning waveform 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct (e.g., adjust, modify) the frequency of the return signal, so the Doppler shift is not shown in FIG. 2 for simplicity and ease of explanation. For example, LIDAR system 100 may correct the frequency of the return signal by removing (e.g., subtracting, filtering) the Doppler shift from the frequency of the returned signal to generate a corrected return signal. The LIDAR system 100 may then use the corrected return signal to calculate a distance and/or range between the LIDAR system 100 and the object. In some embodiments, the Doppler frequency shift of target return signal 202 that is associated with an object may be indicative of a velocity and/or movement direction of the object relative to the LIDAR system 100.

It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
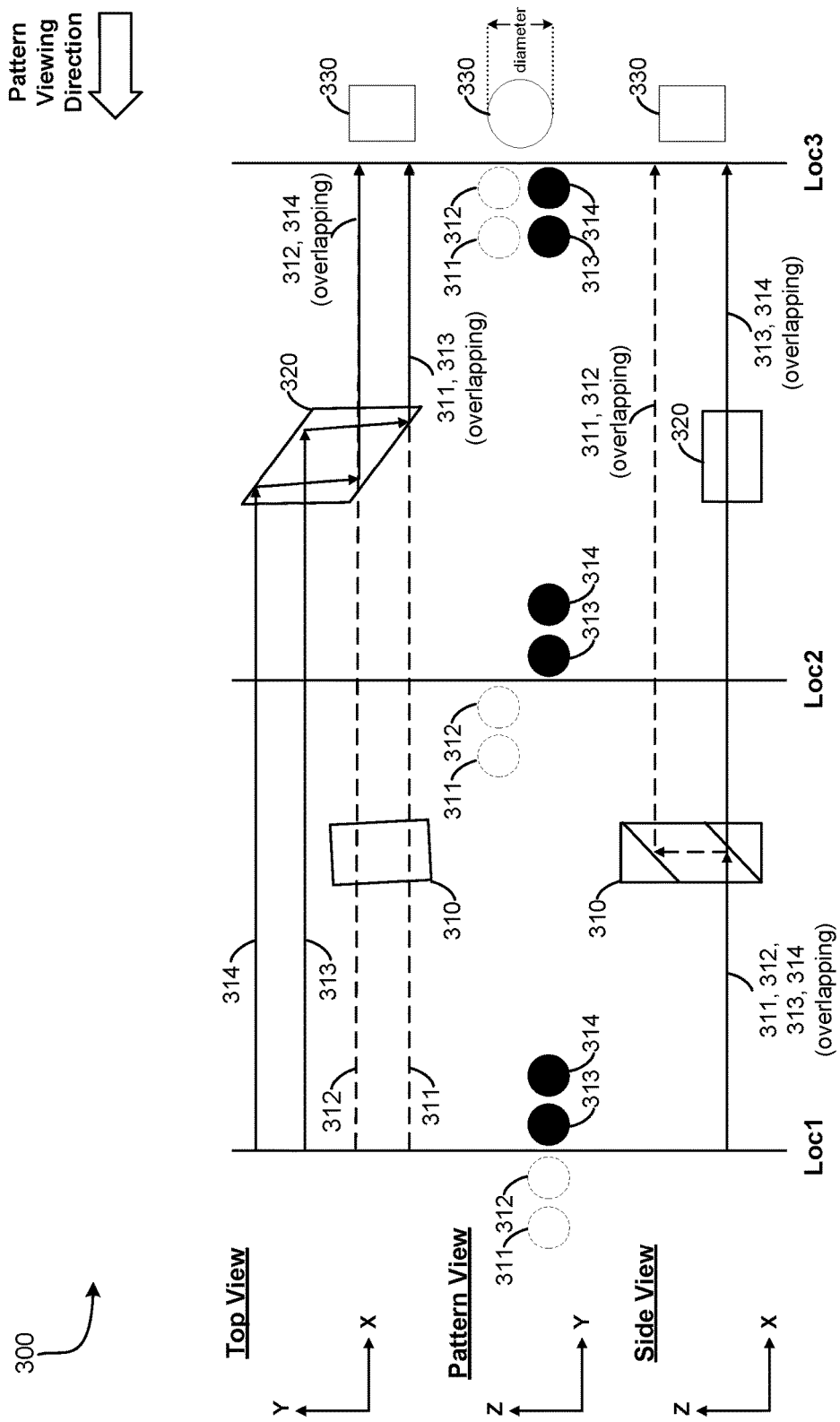
FIG. 3 is a block diagram illustrating an example environment for transforming a linear co-planar optical beam pattern into a multi-planar optical beam pattern, according to some embodiments.

FIG. 3 is a block diagram illustrating an example environment for transforming a linear co-planar optical beam pattern into a multi-planar optical beam pattern, according to some embodiments. The environment 300 includes an optical element 310 (sometimes referred to as, "a vertical prism" or "first optical element") and an optical element 320 (sometimes referred to as, "a horizontal prism" or "second optical element"), that are each configured to receive at least one optical beam that is propagating in a direction along a plane and redirect (e.g., steer) the at least one optical beam into the same or different direction and/or onto the same plane or a different plane. In some embodiments, optical elements 310, 320 may each be any type of mirror (e.g., a polygon mirror). In some embodiments, optical elements 310, 320 may each be any type of prism including, but not limited to, a Risley prism, a wedge prism, a polygonal prism, pentagonal prism, a dove prism, a half pentagonal prism, a right angle prism, a roof prism, or the like.

The environment 300 includes a lens 330 (sometimes referred to as, "optical element") for receiving optical beams from the optical element 310 and/or optical element 320, sending the optical beams into free-space toward one or more objects (e.g., pedestrians, vehicles, street surface, street signs, raindrops, etc.), and collecting the returned optical beams that scatter from the one or more objects. In some embodiments, the lens 330 may be a symmetric lens having a diameter (e.g., 10 mm-40 mmm). In some embodiments, the lens 330 may be an asymmetric lens. In some embodiments, the lens 330 may be any shape, such as, a square, a rectangle, a circle, an oval, etc.

The environment 300 shows the reception and redirection of the optical beams by the optical elements 310, 320 from a "side view" with respect to an X-Z axis, "a pattern view" with respect to a Y-Z axis, and "a top view" with respect to an X-Y axis. Each view shows the optical beam pattern of the optical beams at three distances from the lens 330, such as location 1 (shown in FIG. 3 as "Loc1"), location 2 (shown in FIG. 3 as "Loc2"), and location 3 (shown in FIG. 3 as "Loc3"). In this example, location 1 is the farthest distance from the lens 330 and location 3 is the closest distance to the lens 330. As indicated by the direction of the arrow of the pattern viewing direction in FIG. 3, the pattern view shows the optical beam pattern of the optical beams 311, 312, 313, 314 at locations 1, 2, and 3 when looking into the optical beams 311, 312, 313, 314.

In some embodiments, one or more optical beam sources (not shown in FIG. 3) may generate the optical beams 311, 312, 313, 314 (sometimes referred to as, "a plurality of optical beams") to form the optical beam pattern at location 1 in FIG. 3. As shown in the pattern view in FIG. 3, the arrangement of the optical beams 311, 312, 313, 314 form a linear, co-planar pattern, such that the optical beams 311, 312, 313, 314 have no offset (or a negligible offset) from one another along the Z-axis. In some embodiments, the optical beams 311, 312, 313, 314 are symmetrically (e.g., even) spaced apart from one another along the Y-axis. In some embodiments, the optical beams 311, 312, 313, 314 are asymmetrically (e.g., uneven) spaced apart from one another along the Y-axis.

In some embodiments, the optical beams 311, 312, 313, 314 may be generated by one or more optical beam sources that are included or associated (e.g., controlled by, triggered by) with the LIDAR system 100 in FIG. 1, such as a photonic integrated circuit (PIC). In some embodiments, the LIDAR control system 110 in FIG. 1 may control the PIC to cause the PIC to generate and transmit optical beams. In some embodiments, the PIC may include a plurality of output ports (e.g., channels, pins) that are arranged on the same side of the PIC in a linear coplanar pattern. In some embodiments, the PIC may transmit the optical beams 311, 312, 313, 314 toward the optical elements 310, 320 through its plurality of output ports to form the optical beam pattern at location 1 in FIG. 3.

In some embodiments, the one or more optical beam sources may be configured to transmit (e.g., direct) the optical beams 311, 312 (sometimes referred to as, "a first set of a plurality of optical beams") toward the optical element 310 and the optical beams 313, 314 (sometimes referred to as, "a second set of a plurality of optical beams") toward the optical element 320. In some embodiments, the transmission of the optical beams 311, 312, 313, 314 causes each beam to propagate (e.g., traverse) in a first direction along a first plane (e.g., along the X-axis), such to form a linear coplanar beam pattern. In some embodiments, a linear coplanar beam pattern may be 1 row of optical beams times N, where N is the number of optical beams in the optical beam pattern. For example, a linear coplanar beam pattern may include a row of any number of optical beams from 1 to 64.

In some embodiments, the one or more optical beam sources may each generate an optical beam of any wavelength (e.g., 905 nanometer (nm), 1550 nm) to cause the optical beam pattern at each of the locations (e.g., location 1, location 2, and location 3) to include optical beams of the same wavelength or different wavelengths. For example, the one or more optical beam sources may generate a plurality of optical beams that include a first subset of optical beams that have a wavelength of 905 nm to detect objects of a first type (e.g., water, rain and fog, and snow), and a second subset of optical beams that have a wavelength of 1550 nm to detect objects of a second type (e.g., vehicles, street signs, pedestrian). By using an optical beam pattern that includes optical beams of different wavelengths, the LIDAR system 100 may detect (e.g., identify, discover, resolve) more objects with fewer scans as compared to scanning an environment using an optical beam pattern of a first wavelength and re-scanning the environment using an optical beam pattern of a second wavelength.

From the side view at location 1, the optical beams 311, 312, 313, 314 overlap with one another along the X-axis because their separation along the Y-axis is not visible from the side view. From the pattern view at location 1, the optical beams 311, 312, 313, 314 have a linear co-planar beam pattern. From the top view at location 1, the optical beams 311, 312, 313, 314 are parallel with one another along the X-axis.

In some embodiments, the optical element 310 is configured (e.g., arranged, positioned) to receive the optical beams 311, 312. In some embodiments, the optical element 310 is configured to redirect the optical beams 311, 312 to propagate in the first direction along a second plane (e.g., along the X-axis) toward the lens 330. From the side view at location 2, the optical beams 311, 312 overlap with one another along the X-axis on the second plane because their separation along the Y-axis is not visible from the side view, and the optical beams 313, 314 overlap with one another along the X-axis on the first plane because their separation along the Y-axis is also not visible from the side view. From the pattern view at location 2, the optical beams 311, 312 have a linear co-planar beam pattern on the second plane and the optical beams 313, 314 have a linear co-planar beam pattern on the first plane, where the optical beams 311, 312 are shifted to the left (e.g., further from lens 330) of the optical beams 313, 314 on the Y-axis. From the top view at location 2, the optical beams 311, 312, 313, 314 are parallel with one another along the X-axis.

In some embodiments, the optical element 310 is configured to redirect the optical beams 311, 312 to propagate in the first direction along the second plane by redirecting the optical beams 311, 312 to propagate in an upward direction along a third plane (e.g., along the Z-axis). In some embodiments, the first plane is parallel to the second plane. In some embodiments, the first plane is not parallel to the second plane. In some embodiments, the second plane is above the first plane along the Z-axis. In some embodiments, the third plane is perpendicular to at least one of the first plane or the second plane. In some embodiments, the third plane is not perpendicular to the first plane or the second plane.

In some embodiments, the optical element 320 is configured to receive the optical beams 313, 314. In some embodiments, the optical element 320 is configured to redirect the optical beams 313, 314 to propagate in a second direction (e.g., sideways) along the first plane (e.g., along the X-axis). In some embodiments, the optical element 320 is configured to redirect the optical beams 313, 314 from propagating in the second direction along the first plane to propagate in the first direction along the first plane toward the lens 330. In some embodiments, the optical element 320 is configured to shift (e.g., move) the optical beams 313, 314 to the left along the Y-axis to generate the multi-planar beam pattern at location 3 in FIG. 3. In some embodiments, a multi-planar beam pattern may be any shape, such as, a square, a rhombus, a rectangle, a triangle, a circle, a trapezoid, a hexagon, an octagon, etc.

From the side view at location 3, the optical beams 313, 314 overlap with one another along the X-axis on the first plane because their separation along the Y-axis is not visible from the side view. From the pattern view at location 3, the optical beams 311, 312 have a linear co-planar beam pattern on the second plane and the optical beams 313, 314 have a linear co-planar beam pattern on the first plane, where the optical beams 311, 312, 313, 314 form a multi-planar beam pattern.

In some embodiments, optical elements 310, 320 are configured to generate a multi-planar beam pattern by redirecting and/or forwarding the optical beams 311, 312, 313, 314 through the lens 330. In some embodiments, the optical beams 311, 312, 313, 314 of the multi-planar beam pattern are symmetrically (e.g., even) spaced apart from one another along the Y-axis and the Z-axis. In some embodiments, the optical beams 311, 312, 313, 314 of the multi-planar beam pattern are asymmetrically (e.g., uneven) spaced apart from one another along the Y-axis and the Z-axis.

In some embodiments, the dimensions (e.g., a height, a width, a length, and/or a diameter) of the linear co-planar pattern of the optical beams 311, 312, 313, 314 at location 1 are incompatible with the dimensions of the surface area of the lens 330 such that the optical beams 311, 312, 313, 314 cannot simultaneously pass through the lens 330 when arranged in the linear co-planar pattern. For example, if the length of the linear co-planar pattern of the optical beams 311, 312, 313, 314 at location 1 is greater than the dimensions (e.g., a height, a width, a length, and/or a diameter) of the lens 330, then the optical beams 311, 312, 313, 314 cannot simultaneously pass through the lens 330 when arranged in the linear co-planar pattern.

In some embodiments, the dimensions of the multi-planar pattern of the optical beams 311, 312, 313, 314 at location 3 are compatible with the dimensions of the surface area of the lens 330 such that the optical beams 311, 312, 313, 314 can simultaneously pass through the lens 330 when arranged in the multi-planar pattern. For example, if the length of the multi-planar pattern of the optical beams 311, 312, 313, 314 at location 3 is greater than the dimensions of the lens 330, then the optical beams 311, 312, 313, 314 can simultaneously pass through the lens 330 when arranged in the multi-planar pattern.

Although FIG. 3 shows only a select number of optical elements (e.g., optical element 310, optical element 320); the environment 300 may include any number of optical elements in any arrangement to facilitate the transformation of a linear co-planar optical beam pattern into a multi-planar optical beam pattern. In some embodiments, the operations of the optical elements 310, 320 may be performed by a single optical element. For example, a single optical element may be configured to receive the optical beams 311, 312, 313, 314 propagating in a first direction along a first plane in a linear co-planar beam pattern, redirect the optical beams 311, 312 such that they propagate in the first direction along a second plane, shift the optical beams 313, 314 to the left on the Y-axis, and redirect the optical beams 313, 314 to propagate in the first direction along the first plane. Thus, the single optical element may transform the optical beams 311, 312, 313, 314 from a linear co-planar optical beam pattern into a multi-planar optical beam pattern.

As shown in FIG. 3, the optical element 310 is positioned between location 1 and location 2, and optical element 320 is positioned between location 2 and location 3. However, in some embodiments, the optical element 310 may be positioned between location 2 and location 3, and optical element 320 may be positioned between location 1 and location 2 without altering the operation and functionality of the optical elements 310, 320. It should be appreciated that embodiments of the present disclosure are not limited to the number of optical elements depicted in FIG. 3. For instance, 3 or more optical elements may be included in order to achieve a final beam pattern and/or orientation.

Figure 4:
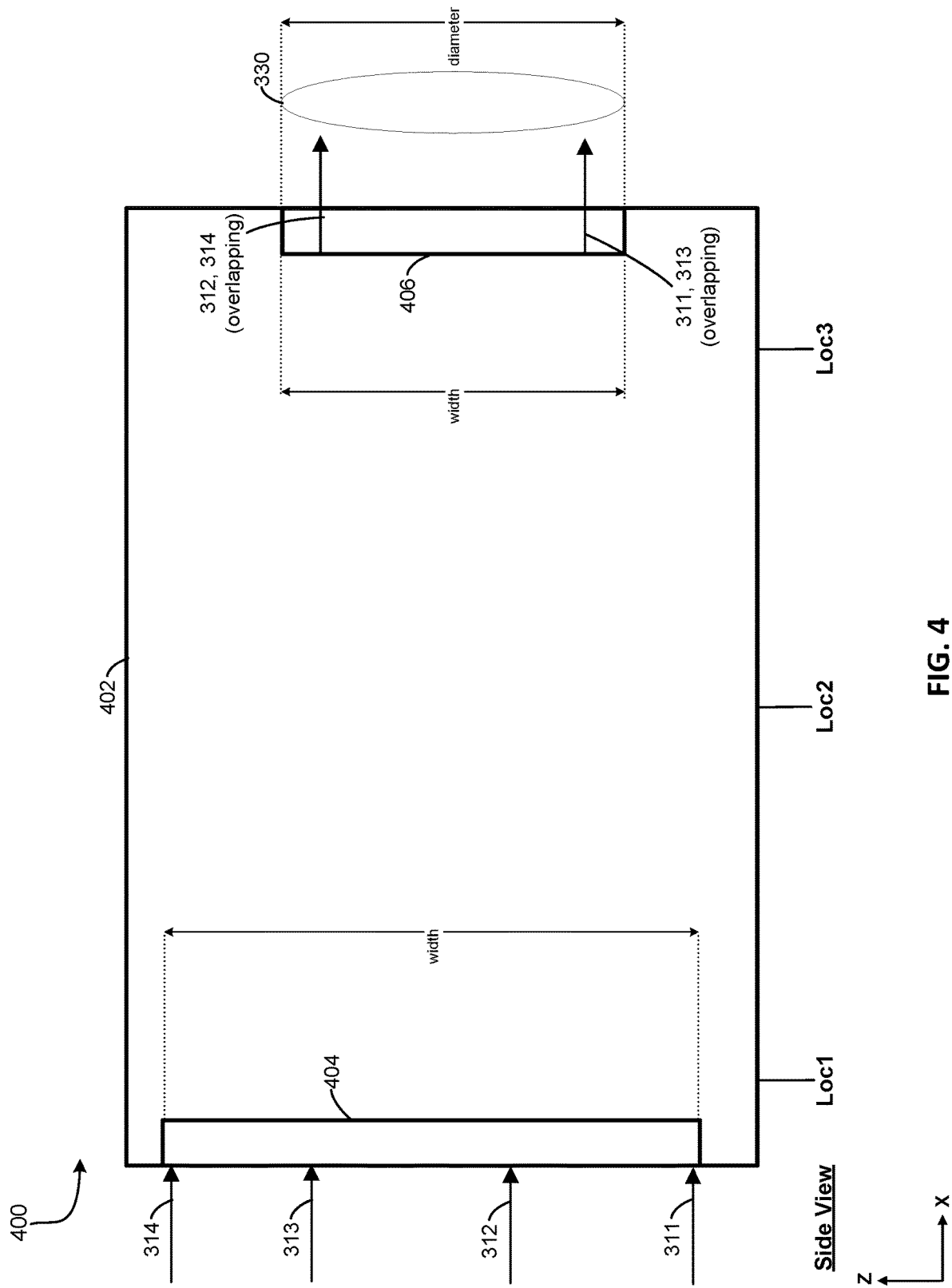
FIG. 4 is a block diagram illustrating an example environment for transforming a linear co-planar optical beam pattern into a multi-planar optical beam pattern, according to some embodiments.

FIG. 4 is a block diagram illustrating an example environment for transforming a linear co-planar optical beam pattern into a multi-planar optical beam pattern, according to some embodiments. The environment 400 includes an enclosure 402 (sometimes referred to as, "an optical assembly") and the lens 330 in FIG. 3. The environment 400 depicts the enclosure 400 and the lens 330 according to the side view in FIG. 3, which is with respect to the X-Z axis. The environment 400 includes location markers (e.g., Loc1, Loc2, Loc3) that correspond to the location markers in FIG. 3.

In some embodiments, the enclosure 402 is configured to include and hold the optical elements 310, 320 (not shown in FIG. 4) in FIG. 3. In some embodiments, the enclosure 402 includes a window 404 that is configured (e.g., sized) to receive the optical beams 311, 312, 313, 314 from the one or more optical sources, as discussed herein. In some embodiments, the enclosure 402 includes a window 406 that is configured (e.g., sized) to allow the optical elements 310, 320 to transmit the optical beams 311, 312, 313, 314 in a multi-planar pattern toward the lens 330.

In some embodiments, the width of the window 406 is equal to or less than the dimensions of the lens 330. In some embodiments, the width of the window 404 exceeds the width of the window 406 and/or the dimensions of the lens 330. In some embodiments, the width of the window 406 is not large enough to allow the linear co-planar pattern of the optical beams 311, 312, 313, 314 at location 1 to simultaneously pass through the window 406, but is large enough to allow the multi-planar pattern of the optical beams 311, 312, 313, 314 at location 3 to simultaneously pass through the window 406. In this instance, the transformation of the optical beams 311, 312, 313, 314 by the optical elements 310, 320 from a linear co-planar pattern to a multi-planar pattern allows a LIDAR system to be reduced (e.g., scale down). For example, the dimensions (e.g., height, and/or width) of the window 406 of the enclosure 402 and the dimensions of the lens 330 can be reduced without degrading the performance of the LIDAR system 100.

FIG. 5 is a flow diagram illustrating an example method for transforming a linear co-planar optical beam pattern into a multi-planar optical beam pattern, according to some embodiments. Additional, fewer, or different operations may be performed in the method depending on the particular arrangement. In some embodiments, some or all operations of method 500 may be performed by one or more processors executing on one or more computing devices, systems, or servers (e.g., remote/networked servers or local servers). In some embodiments, method 700 may be performed by a signal processing unit, such as signal processing unit 112 in FIG. 1. Each operation may be re-ordered, added, removed, or repeated.

In some embodiments, the method 500 may include the operation 502 of receiving, by an optical assembly, a plurality of optical beams propagating in a first direction along a first plane in a coplanar beam pattern. In some embodiments, the method 500 may include the operation 504 of redirecting, by the optical assembly, a first set of the plurality of optical beams to propagate in the first direction along a second plane. In some embodiments, the method 500 may include the operation 506 of redirecting, by the optical assembly, a second set of the plurality of optical beams to propagate in a second direction along the first plane.

In some embodiments, the method 500 may include the operation 508 of redirecting, by the optical assembly, the second set of the plurality of optical beams propagating in the second direction along the first plane to propagate in the first direction along the first plane. In some embodiments, the method 500 may include the operation 510 of generating, by the optical assembly, a multi-planar beam pattern by forwarding the first set of the plurality of optical beams and the second set of the plurality of optical beams through an optical element.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising: receiving, by an optical assembly, a plurality of optical beams in a first direction along a first plane in a first beam pattern towards an optical element based on a trajectory that causes at least a portion of the plurality of optical beams to not contact a surface of an optical lens; transmitting, by the optical assembly, a first set of the plurality of optical beams in the first direction along a second plane, wherein the first plane is different from the second plane; transmitting, by the optical assembly, a second set of the plurality of optical beams in the first direction along the first plane, and generating, by the optical assembly, a second beam pattern by transmitting the first set of the plurality of optical beams and the second set of the plurality of optical beams through an optical element, wherein the second beam pattern adjusts the trajectory to cause the portion to contact the surface of the optical lens.

2. The method of claim 1, wherein the first plane is parallel to the second plane.

3. The method of claim 1, further comprising:
transmitting, by the optical assembly, the second set of the plurality of optical beams in a second direction along the first plane prior to transmitting the second set of the plurality of optical beams in the first direction along the first plane.

4. The method of claim 1, wherein the optical assembly comprises a first optical element and a second optical element and further comprising:
transmitting, by the optical assembly, the first set of the plurality of optical beams to propagate in the first direction along the second plane by using the first optical element; and
transmitting, by the optical assembly, the second set of the plurality of optical beams to propagate in the second direction along the first plane by using the second optical element.

5. The method of claim 1, wherein the transmitting the first set of the plurality of optical beams to propagate in the first direction along the second plane comprises:
transmitting, by the optical assembly, the first set of the plurality of optical beams to propagate along a third plane.

6. The method of claim 5, wherein the third plane is perpendicular to the first plane and the second plane.

7. The method of claim 1, wherein a length of the first beam pattern is greater than a diameter of the optical element and a length of the second beam pattern is less than the diameter of the optical element.

8. The method of claim 1, wherein the optical assembly is enclosed in an enclosure comprising a window, a length of the first beam pattern is greater than a length of the window and a length of the second beam pattern is less than the length of the window.

9. The method of claim 1, wherein the second beam pattern comprises an asymmetric vertical beam spacing.

10. The method of claim 1, wherein the receiving the plurality of optical beams propagating in the first direction along the first plane in the first beam pattern comprises:
receiving, by the optical assembly, the plurality of optical beams via a photonic integrated circuit (PIC).

11. A system comprising: an optical source to generate a plurality of optical beams that propagate in a first direction along a first plane in a first beam pattern towards an optical element based on a trajectory that causes at least a portion of the plurality of optical beams to not contact a surface of an optical lens; and an optical assembly coupled to the optical source, the optical assembly comprising one or more optical elements to: receive the plurality of optical beams; transmit a first set of the plurality of optical beams in the first direction along a second plane, wherein the first plane is different from the second plane; transmit a second set of the plurality of optical beams in the first direction along the first plane, and generate a second beam pattern by transmitting the first set of the plurality of optical beams and the second set of the plurality of optical beams through an optical element, wherein the second beam pattern adjusts the trajectory to cause the portion to contact the surface of the optical lens.

12. The system of claim 11, wherein the first plane is parallel to the second plane.

13. The system of claim 11, wherein the one or more optical elements further to:
transmit the second set of the plurality of optical beams in a second direction along the first plane prior to transmitting the second set of the plurality of optical beams in the first direction along the first plane.

14. The system of claim 11, wherein the first optical element is to further:
transmit the first set of the plurality of optical beams to propagate along a third plane.

15. The system of claim 14, wherein the third plane is perpendicular to the first plane and the second plane.

16. The system of claim 11, wherein a length of the first beam pattern is greater than a diameter of the optical element and a length of the second beam pattern is less than the diameter of the optical element.

17. The system of claim 11, wherein
the optical assembly is enclosed in an enclosure comprising a window, and
a length of the first beam pattern is greater than a length of the window and a length of the second beam pattern is less than the length of the window.

18. The system of claim 11, wherein the second beam pattern comprises an asymmetric vertical beam spacing.

19. The system of claim 11, wherein the optical assembly receives the plurality of optical beams from a photonic integrated circuit (PIC).

20. An optical assembly comprising: a first optical element to: receive a first set of a plurality of optical beams, wherein the plurality of optical beams propagate in a first direction along a first plane in a first beam pattern towards an optical element based on a trajectory that causes at least a portion of the first set of the plurality of optical beams to not contact a surface of an optical lens; transmit the first set of the plurality of optical beams in the first direction along a second plane, wherein the first plane is different from the second plane; and transmit the first set of the plurality of optical beams through an optical element; and a second optical element to: receive a second set of the plurality of optical beams; transmit the second set of the plurality of optical beams in the first direction along the first plane; and transmit the second set of the plurality of optical beams through the optical element, wherein a second beam pattern is generated responsive to the transmitting of the first set of the plurality of optical beams through the optical element by the first optical element and the transmitting of the second set of the plurality of optical beams through the optical element, wherein the second beam pattern adjusts the trajectory to cause the portion to contact the surface of the optical lens.

* * * * *